United States Patent [19]
Young

[11] Patent Number: 5,995,555
[45] Date of Patent: Nov. 30, 1999

[54] PRECODED WAVESHAPING TRANSMITTER FOR A TWISTED PAIR WHICH ELIMINATES THE NEED FOR A FILTER

[75] Inventor: David Young, San Jose, Calif.

[73] Assignee: Advanced Micro Devices, Inc., Sunnyvale, Calif.

[21] Appl. No.: 08/947,924

[22] Filed: Oct. 9, 1997

Related U.S. Application Data

[63] Continuation of application No. 08/599,526, Feb. 2, 1996, abandoned, which is a continuation of application No. 08/214,896, Mar. 17, 1994, abandoned.

[51] Int. Cl.[6] .................................................. H04L 25/03
[52] U.S. Cl. ................................. 375/296; 332/107
[58] Field of Search .................................. 375/257, 295, 375/296; 327/107; 332/107; 377/64; 11/68; 341/70

[56] References Cited

U.S. PATENT DOCUMENTS

| | | | |
|---|---|---|---|
| 3,609,393 | 9/1971 | Yao | 377/68 |
| 3,745,371 | 7/1973 | Suzuki | 377/68 |
| 3,757,331 | 9/1973 | Moulton | 342/149 |
| 3,806,807 | 4/1974 | Nakamura | 375/296 |
| 4,553,213 | 11/1985 | Hyatt | 364/514 |
| 5,016,263 | 5/1991 | Kitagawa et al. | 377/68 |
| 5,267,269 | 11/1993 | Shih et al. | 375/296 |

OTHER PUBLICATIONS

Schilling, D., and Belove, C., *Electronic Circuits: Discrete and Integrated*, 3rd Ed. New York: McGraw–Hill Book Company, 1989, pp. 734–745.

*Primary Examiner*—Temesghen Ghebretinsae
*Attorney, Agent, or Firm*—Sawyer & Associates

[57] ABSTRACT

A precoded waveshaping transmitter comprises a synchronous delay line circuit, a transmitter state machine and a differential current digital to analog converter. Through the provision of a plurality of precoded staggered time delayed data from the combination of the delay line circuit and transmitter state machine the DAC can provide a predetermined output. In a preferred implementation, a subharmonic frequency can be maintained at least 27dB below the fundamental frequency when the PWT is driven by an all ones Manchester encoded signal.

7 Claims, 9 Drawing Sheets

PRECODED WAVESHAPING TRANSMITTER FOR A TWISTED PAIR WHICH ELIMINATES THE NEED FOR A FILTER

This application is a continuation of Ser. No. 08/599,526, filed Feb. 2, 1996 which is a continuation of Ser. No. 08/214,896, filed Mar. 17, 1994, both abandoned.

FIELD OF THE INVENTION

The present invention relates generally to transceivers utilized in a local area network and more particularly to the transmitter utilized in such transceivers.

BACKGROUND OF THE INVENTION

In late 1990, the Institute of Electrical and Electronics Engineers (IEEE), the standards body which maintains Local Area Network (LAN) standards, revised the 802.3 Ethernet specification to add the so-called 10BASE-T specification, which allows use of unshielded twisted pair as one the media for interconnection of Ethernet nodes. Because 10BASE-T lowers the overall cost of building a local area network and provides for certain network management functions not possible with traditional thick and thin coax media, it is expected to become the predominant medium in the future, with the percentage of new nodes using 10BASE-T expected to rise from about 30% in 1991 to more than 80% by 1995.

Most current designs for an Ethernet network interface card (NIC) consist of three chips: a transceiver, a Manchester encoder/decoder and the network controller. The transceiver and the encoder/decoder are connected through the Attachment Unit Interface (AUI) port, which provides a medium independent interface. When twisted-pair (TP) was first introduced as a medium for Ethernet, a technique of predistorting the wide pulse and putting it through a 7th order elliptic filter with 3dB band edge at 15–20 MHz was used to fit it into the existing jitter budget of the network. Therefore, a TP medium attachment unit is usually implemented together with a transceiver, a hybrid transmit/receive filter and a transformer.

Testing and reliability issues of the discrete hybrid filter have made the integration of the external filter an important issue. Also, to improve overall reliability and costs, integration of the transceiver, encoder/decoder, external filter and, eventually, the network controller has become a goal for the local area network equipment designer.

One embodiment of such a precoded waveshaping technique, disclosed by LEVEL ONE COMMUNICATIONS and Fujitsu Corp. in two papers entitled 10Mb/s 10BASE-T/AUI TRANSCEIVER WITH INTEGRATED WAVESHAPING FILTER AND DATA RECOVERY, and A HIGH INTEGRATED PRODUCT FAMILY FOR 10BASE-T APPLICATIONS, respectively includes a Manchester encoded signal at its output and does not require a typical 10BASE-T 5–7th order 15 MHz elliptic passive filter. The only external components are the insertion resistors and the line isolation transformer. The waveshaping technique is based on shaping the output waveform at N times the data rate to make it appear as though it has been passed through an elliptic filter. The high frequency signal aliasing is then eliminated by a first order lowpass continuous filter. To reconstruct the significant trailing tail effect from the previous pulse, two bits of information are used to decide the proper waveshaping. Although this prior waveshaping apparatus is an improvement over previously known systems it has some disadvantages. This technique requires an active filter which consumes additional power and also provides additional complexity to the transmitter. An additional problem is that the conventional prior art waveshaping techniques use 1 to √2 transform ratio to avoid headroom problems with output of the line driver. This ratio can cause nonlinear behavior at the output due to additional harmonics on the output signal. A final disadvantage of conventional waveshaping techniques is that a certain amount of open loop gain is required at the sample frequency. Hence, the line driver circuit will be sensitive to temperature and process variations.

Accordingly, what is needed is a precoded waveshaping transmitter that overcomes the above mentioned problems associated with conventional transmitters. The present invention addresses such a need.

SUMMARY OF THE INVENTION

The present invention is an improved precoded waveshaping transmitter that includes a delay line circuit for receiving a clock signal and providing a plurality of delayed clock signals; a transmitter state machine coupled to the delay line circuit for receiving data signals and the clock signal and providing a precoded plurality of staggered time delayed data; and a digital to analog converter means for providing a substantially sinusoidal output.

DETAILED DESCRIPTION OF THE DRAWINGS

The present invention relates to an improvement in a transmitter utilized in a local area network. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention discloses a pre-coded waveshaping transmitter (PWT) that overcomes design constraints of the conventional analog signal processing techniques. The scheme takes full advantage of the fact that Manchester encoded data has only two fundamental frequency components in its make up. By pre-coding this information into a pre-defined sinusoid voltage template, we can reconstruct the output waveform at twenty times the data rate to make it appear as though it had been passed through an 5–7th order passive filter. The high-frequency sampling signal aliasing is then filtered out by using a first-order RC low-pass filter. The key point to the design is to use on-chip staggering timing delay lines to drive a pre-coded non-linear full differential current DAC. This design method can be used in many applications of analog signal processing in which it is necessary to be able to realize nonlinear voltage-transfer function. This requirement can be easily achieved by simply changing the current weight inside the DAC.

Figure 1:
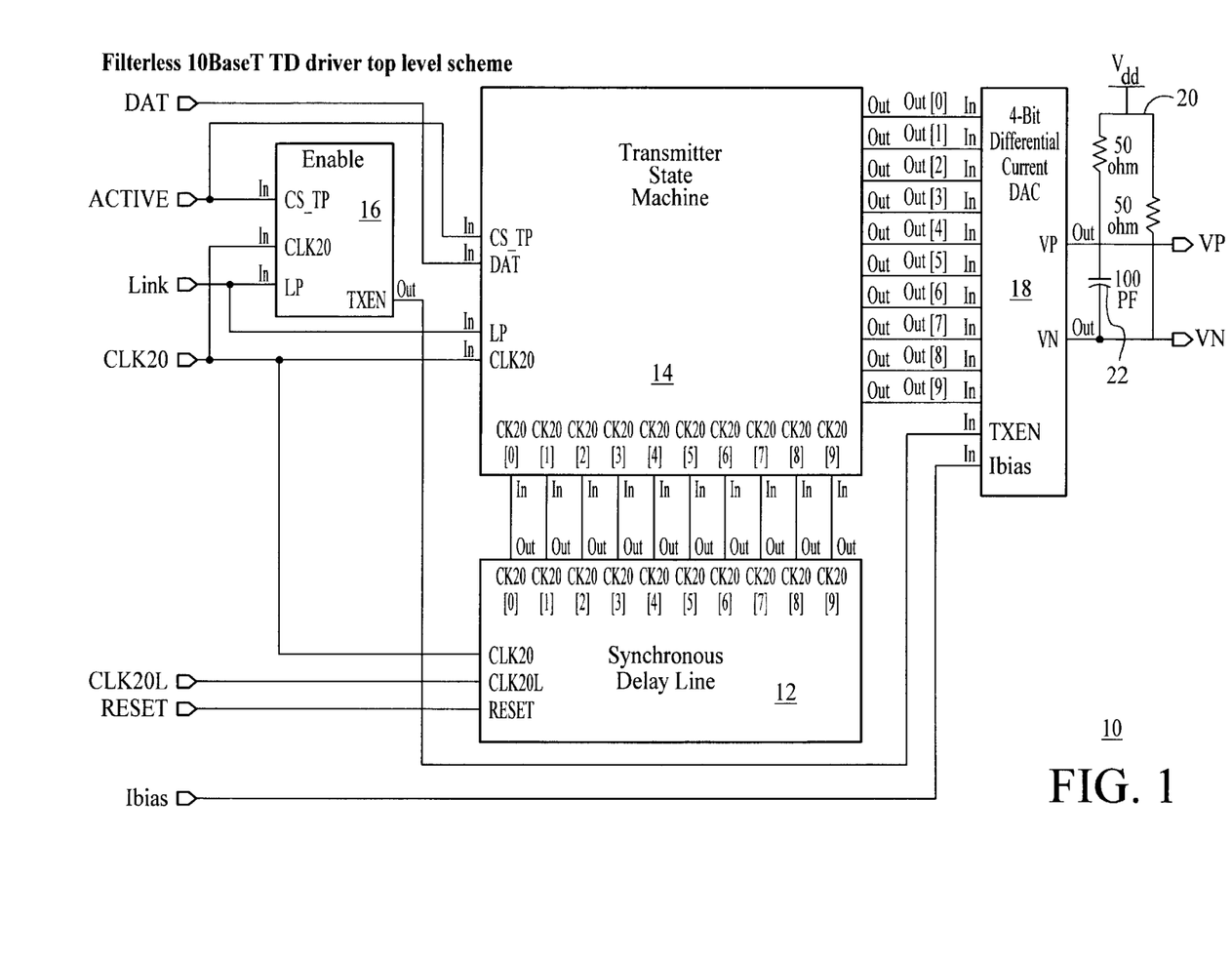
FIG. 1 is a block diagram of a precoded waveshaping transmitter in accordance with the present invention.

To more particularly describe the features of the present invention refer now to FIG. 1 which is a block diagram representation of a precoded waveshaping transmitter (PWT) 10 in accordance with the present invention. The PWT 10 comprises a high frequency synchronous delay line circuit 12, a transmitter state machine 14 coupled to the delay circuit 12 and an enable state machine 16 coupled to the transmitter state machine. Finally the transmitter 10 includes a differential digital to analog converter (DAC) output stage 18 coupled to the enable state machine 16 and to the transmitter state machine 14.

In a preferred embodiment, the high frequency synchronous delay line circuit 12 provides ten (10) staggered timing pulses, each of the staggered timing pulses evenly carries 1/10 of the total delay, and the total delay is the clock period of the precise input reference clock. In this embodiment, a 20 MHz (50ns period) clock is utilized as an input, so the timing pulses are 5-ns intervals apart. A delay line circuit capable of providing such timing pulses is disclosed in U.S. Pat. No. 5,539,398 entitled, A PRECISE DELAY LINE CIRCUIT WITH PREDETERMINED RESET TIME LIMIT, filed on the same date as the present application, assigned to the assignee of the present application and incorporated herein by reference. The operation of a preferred embodiment of the delay line circuit is described hereinbelow in conjunction with FIGS. 2–5.

Figure 2A:
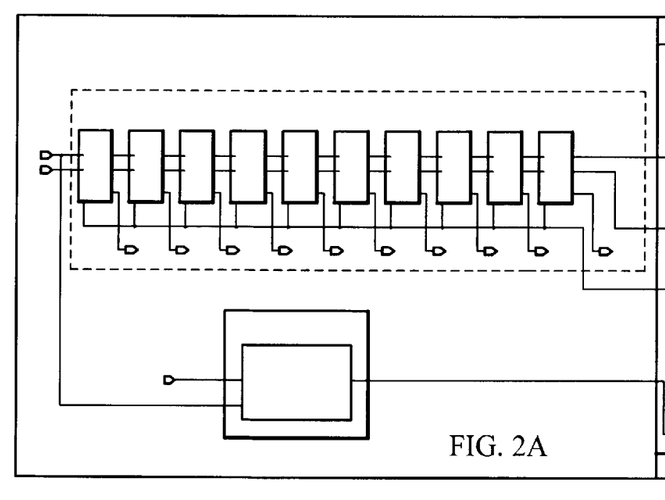
FIG. 2 is a block diagram of a delay circuit in accordance with the present invention.
Figure 2B:
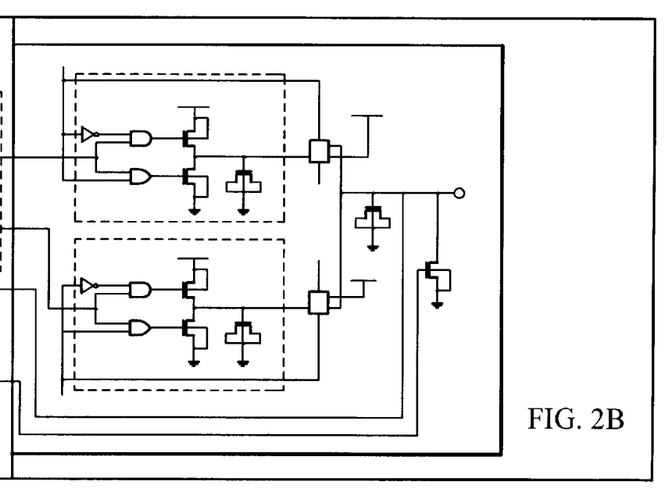

FIG. 2 shows a block diagram representation of a preferred embodiment of a delay line circuit 100 in accordance with the present invention. The delay circuit comprises voltage-controlled delay circuit 102 coupled to a sample-and-hold and low-pass filter circuit 104. An on-chip reset limit circuit 106 is coupled between the VCD 102 and sample and hold circuits.

Through this improved delay line circuit 100 a precise delay is provided wherein both edges of the clock signal are delayed in the appropriate manner. The delay line circuit 100, also through the use of the on-chip reset limiting circuit 106, provides for a predetermined time for the reset of the delay line circuit 100 which is significantly less than that of the system reset of the integrated circuit.

Figure 3:
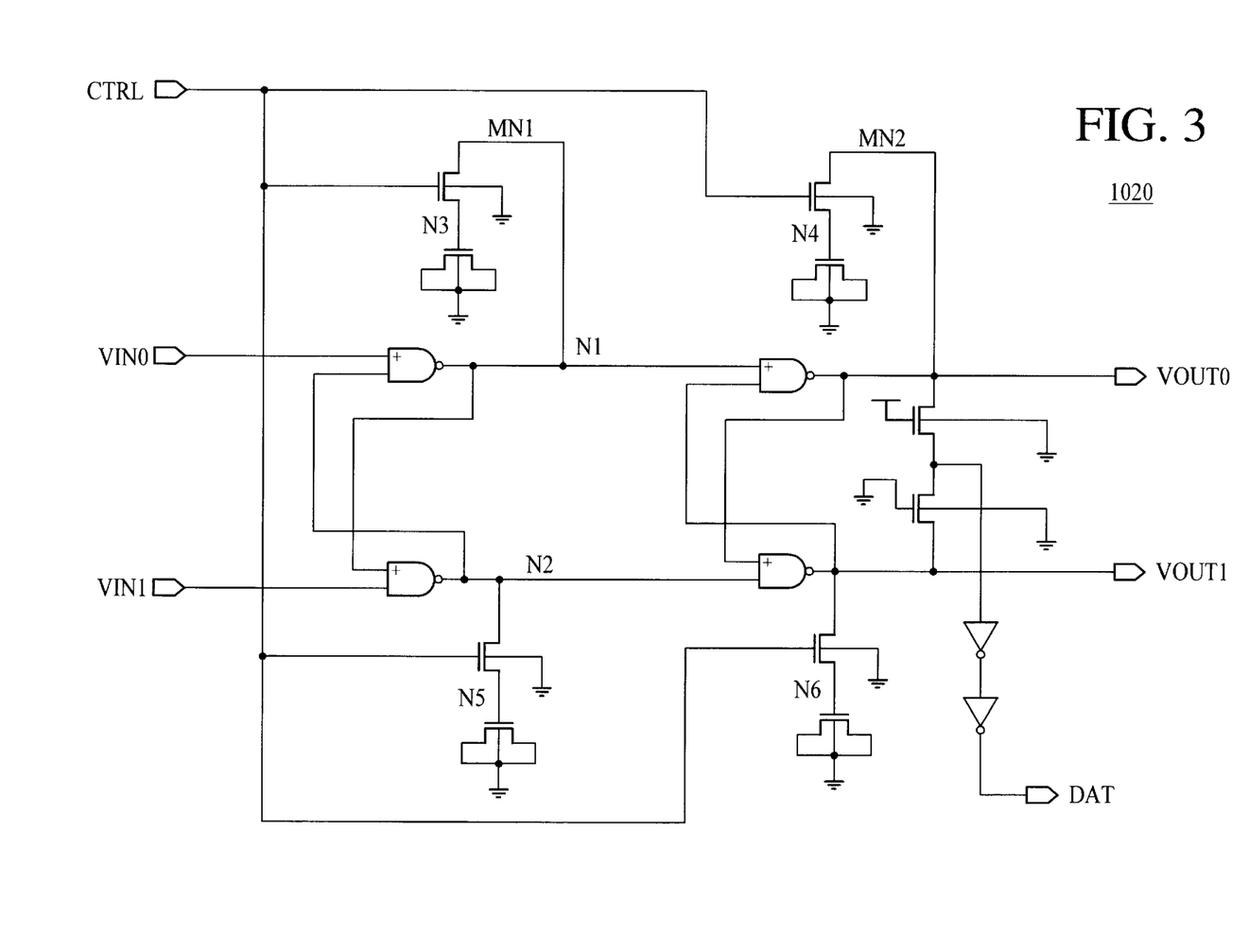
FIG. 3 is a block diagram of the voltage-controlled delay cell in accordance with the present invention.
Figure 4:
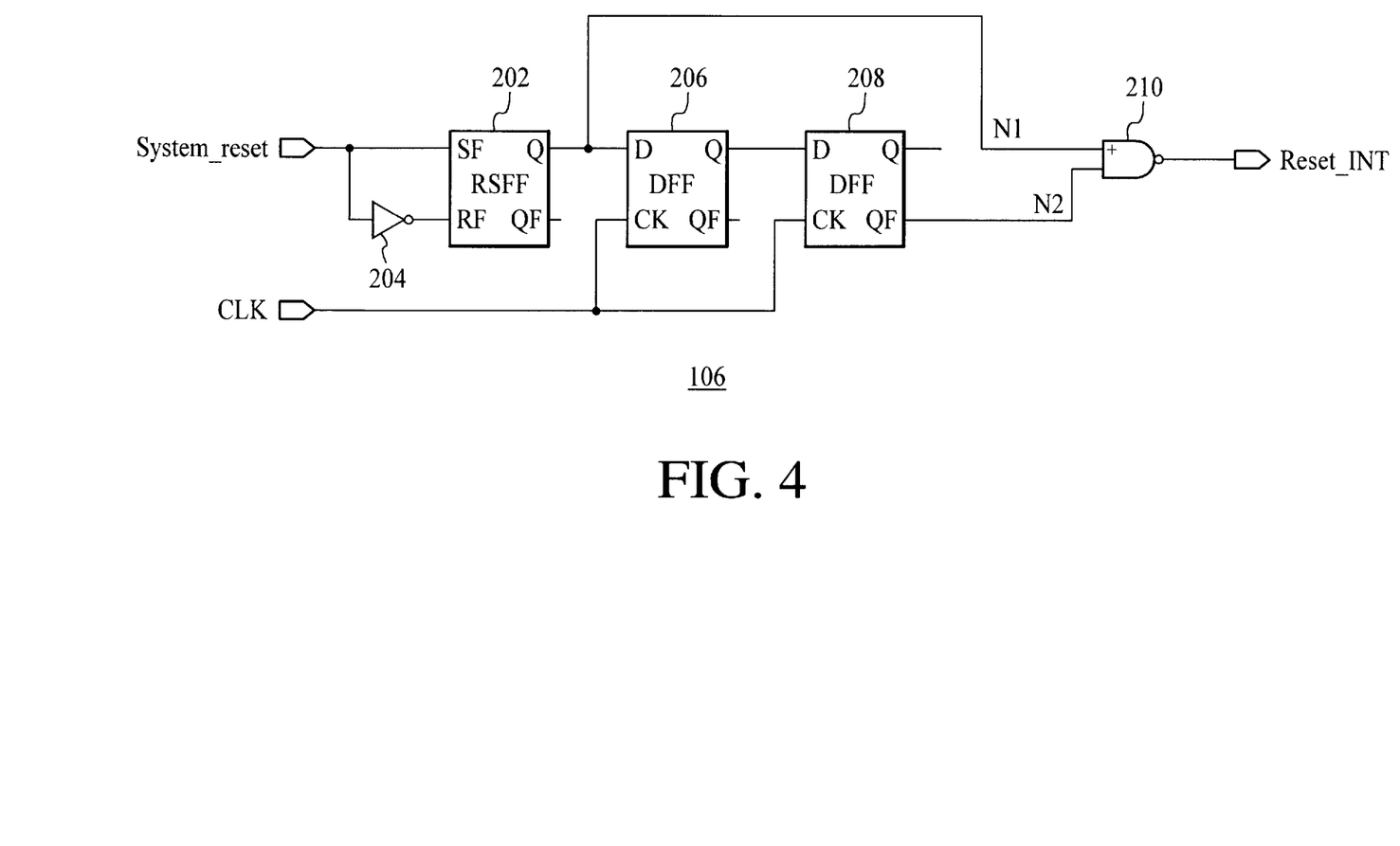
FIG. 4 is a block diagram of an on-chip reset cell in accordance with the present invention.
Figure 5:
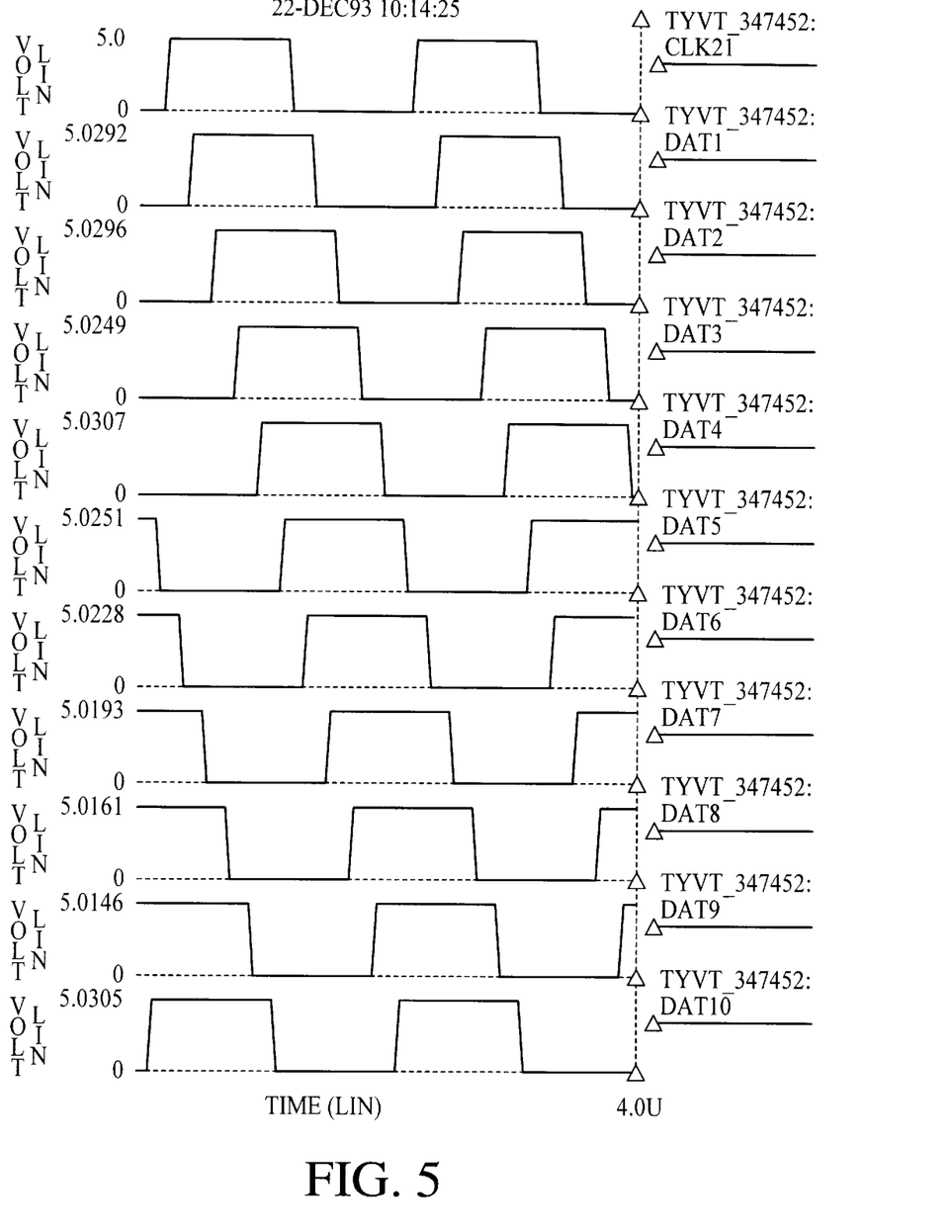
FIG. 5 shows the output waveforms for each delay line versus the input reference clock in accordance with the present invention.

To more clearly describe the operation of the above-identified delay line circuit 100 refer now to FIGS. 3–5 in conjunction with the following discussion.

FIG. 3 shows one voltage delay cell 1020 of the delay cell circuit 100 used with the present invention. The delay cell 1020 of the present invention comprises two delay cells. In so doing, zero phase shift across the delay cell 1020 is achieved and therefore, a true timing delay of the incoming reference clock (CLK) can be achieved.

The sample-and-hold circuit 104 samples the value of the output voltage from the last delay cell 1020 at the clock phase transitions. The sample and hold circuit 104 comprises two circuits 1040 that operate in parallel to provide the desired output. Each of the circuits 1040 samples one of the two outputs from the delay line circuit 100 on alternate clock phases. The results of the sampled outputs are then filtered and fed back as voltage control (Vctrl) 120. If the total delay through the delay line circuit 100 (sampled at the last stage delay cell 1020) is less than the clock period, then a voltage slightly less than VDD will be sampled to the sample-and-hold circuit.

Vctrl 120 will then begin adding more delay through each of the delay cells 1020, thereby causing the total delay through the delay line circuit 100 to increase. When the total delay from the delay line circuit 100 is equal to the reference clock period, the Vctrl 120 will reach a steady-state voltage to maintain the total delay at approximately the clock period of a reference clock.

Similarly, if the total delay from the voltage controlled delay line circuit 100 is longer than the reference clock period, then a voltage slightly above ground will be sampled by the sample-and-hold circuit 104. Vctrl 120 then begins decreasing to speed up each of the delay cells 1020, thereby causing the total delay through the delay line circuit 100 to decrease.

Referring now to FIG. 4, a block diagram of an on-chip reset limiting circuit 106 used with the present invention is shown. The on-chip reset limiting circuit 106 comprises a reset flip-flop 202 which receives a system reset signal at the input. The system reset signal is also coupled to an input of an inverter 204. The output of the inverter 204 is coupled to a second input of the flip-flop 202. The clock signal is coupled to the clock input of D flip-flops 206 and 208 respectively. The Q output of flip-flop 202 is coupled to the D input of flip-flop 206 and one of the inputs of a NAND gate 210. The output of flip-flop 206 is coupled to the D input of flip-flop 208. The 0 output of flip-flop 208 is coupled to a second input of the NAND gate 210. The output of the NAND gate 210 provides the limited reset signal.

The on-chip reset circuit 106 receives the system reset signal and clock signal as inputs. The reset circuit 106 resets on a system reset transition edge for a predetermined clock period, for example, a two clock period, then the reset signal goes away while the system reset is still in the reset state. Since the system reset is much longer than the two clock period required to reset the delay line circuit 100, the remaining time of the system reset will enable the delay line circuit 100 to reach its steady-state condition. It should be understood that the time period for the reset can be a variety of lengths dependent upon the number and kind of logic gates utilized.

The advantage of this reset method is that no sensing circuitry is required to monitor the delay line circuit 100 operation to issue a reset signal when the delay line operates in sub-harmonic mode. Therefore, this method of resetting is more reliable than conventional delay line circuits.

FIG. 5 shows a timing diagram of such a design with CLK20 being the precise input 20 MHz reference clock, DAT1-DAT10 being the 10 staggered timing pulses with a true representation of the delays. As is seen, the rising and falling edges of the delays are accurately represented. Hence, the delays are more precise than those provided by conventional delay line circuits.

The precise delay line circuit 100 herein described uses a simpler reset scheme to achieve a reset requirement needed by the delay line to operate in its fundamental mode and also to provide a true timing delay of the incoming reference clock which is desired for many applications.

Referring back to FIG. 1, the transmitter state machine 14 combines the input data pattern and staggered timing pulses from the delay line circuit such that the transmitter state machine 14 generates an output code sequence at predetermined timing intervals apart. This output code sequence is then utilized by the digital-to-analog converter (DAC) 18 to re-construct a sinusoidlike analog waveform.

This coding scheme provides for the output codes to be generated directly from the input data and the staggered timing pulses, therefore avoiding the conventional approach which requires a complex state machine and a ROM due to the use of active filtering techniques. Also since the output codes are directly synchronized with the precise input 20 MHz clock and the jitter-free Manchester encoded data, the output jitter from the coding scheme is minimized. The transmitter state machine can be implemented in one embodiment as a switched network arrangement.

Figure 6:
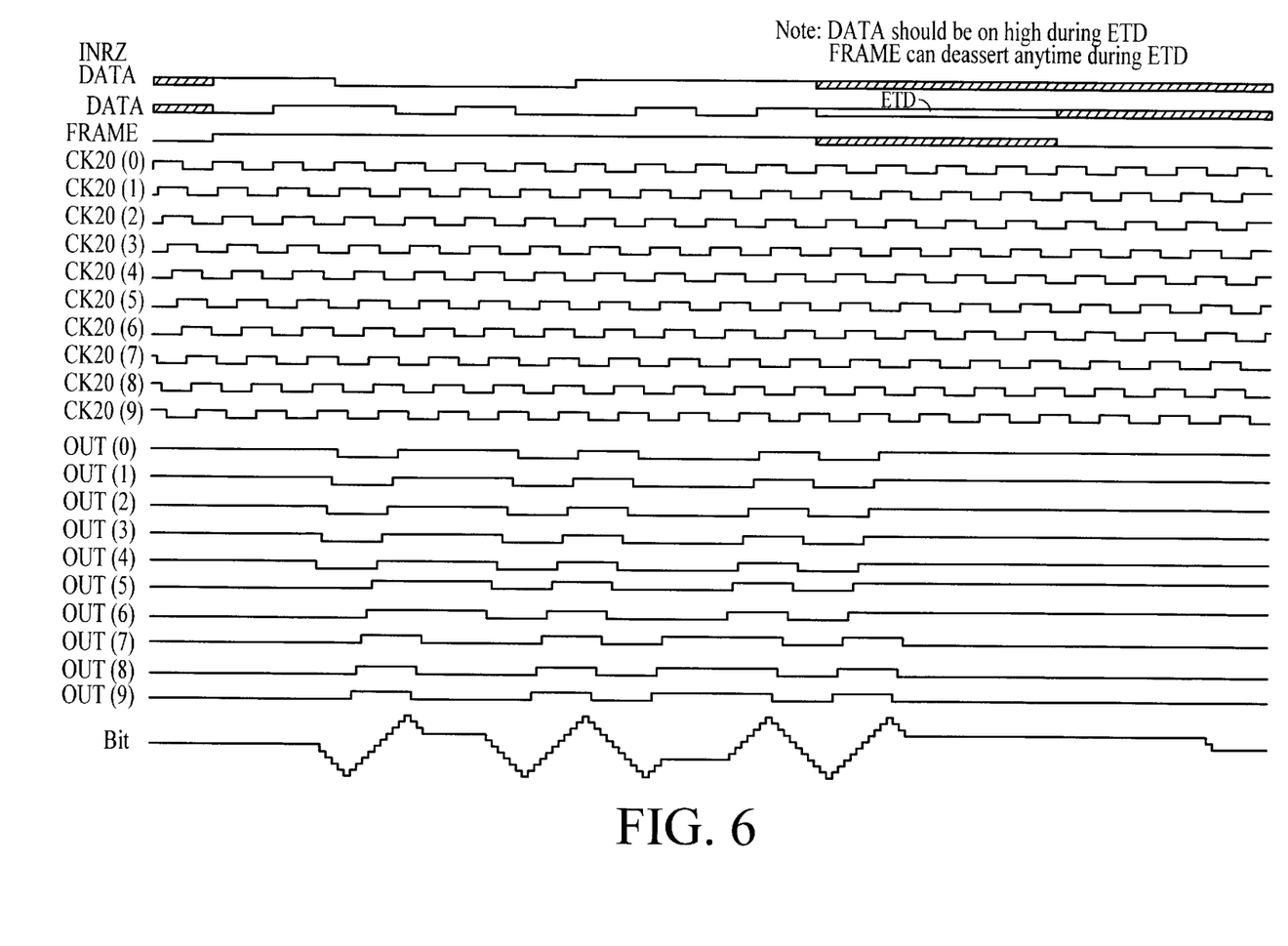
FIG. 6 shows a timing diagram of the operation of the precoded waveshaping transmitter of FIG. 1.

FIG. 6 shows a timing diagram of such a design with data being input ck2O(0)–ck2O(9) being the 10 staggered timing pulses and out(0)–out(9) being the 10 output bit lines which are associated with the input data pattern.

The primary functions of the state machine 16 are to enable the DAC 18 and also provide a pulse width stretch function during an end of transmission delimiter (ETD) and link pulse generation.

The DAC 18 in a preferred embodiment is a four (4) bit full differential current DAC. The DAC 18 is used to translate the digital coding information from the coding scheme output to its corresponded analog output signal. The DAC is weighted such that every bit corresponds to a pre-assigned point on a sinusoid waveform to provide the fullest frequency spectrum. In a preferred embodiment, the current output from the DAC 18 is converted into voltage through the two resistor network 20, which provides a nominal ±2.5V voltage swing across the twisted-pair wire. The high-frequency sampling signal aliasing is then filtered out by using a first-order RC low-pass filter 22 which is formed by two resistors of resistor network 20 and the capacitor between them.

Figure 7:
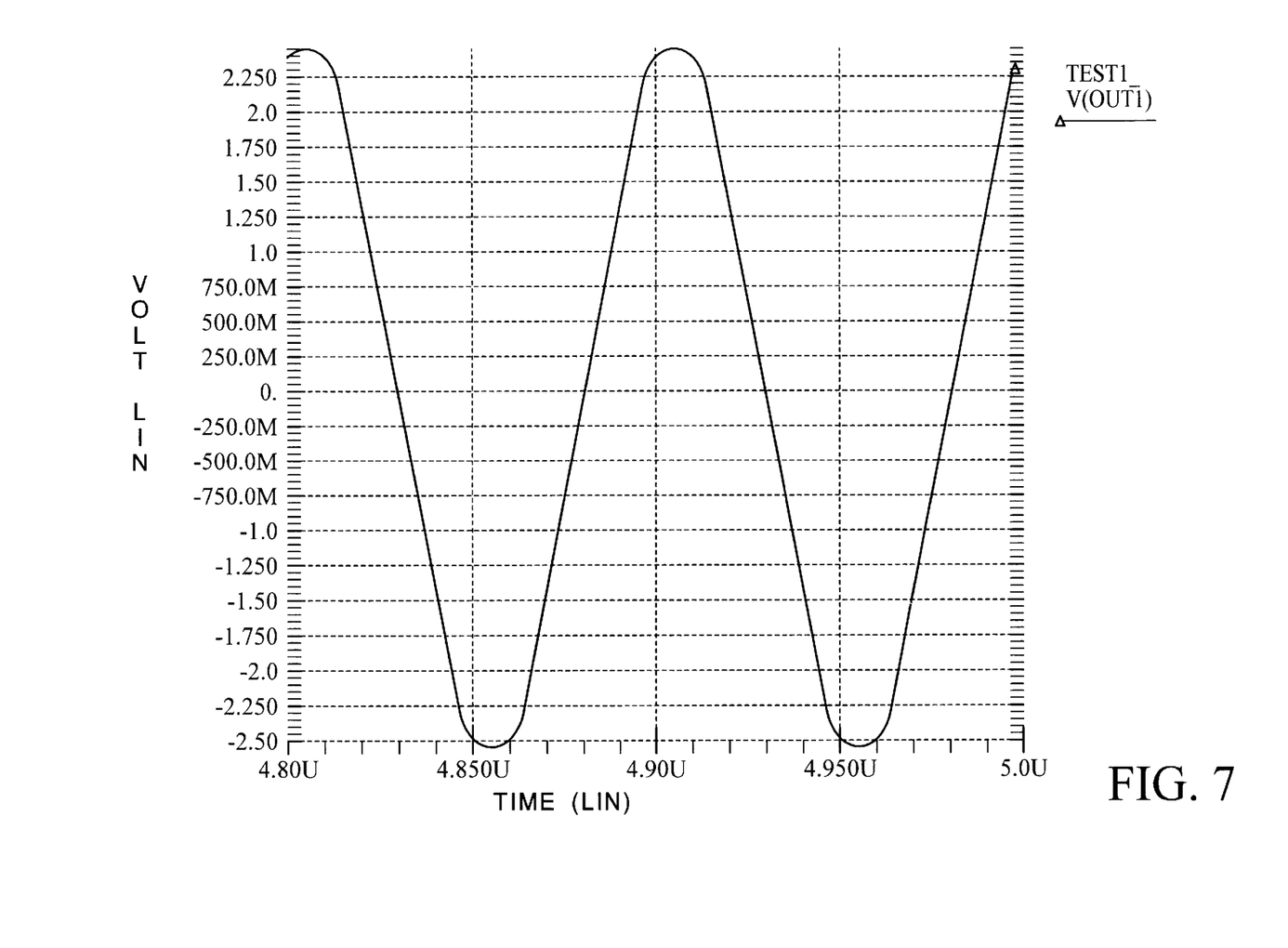
FIG. 7 shows a waveform of the output of the precoded waveshaping transmitter of FIG. 1.

FIG. 7 shows a plot of the output of the PWT circuit 10 in accordance with the present invention when the PWT circuit 10 transmits a continuous 10 MHz output data. As is seen the output represents close to a sinusoidal function.

The pre-coding waveshaping transmitter described here uses a simply coded scheme to achieve the required 5–7th external elliptic transmit filter. In a preferred embodiment a subharmonic frequency can be maintained at least 27dB below the fundamental frequency when the circuit is driven by all-ones Manchester encoded data in accordance with the IEEE Standard 802.3 10BASE-T specification. Simulations show the jitter at zero line length and 100 m to be less than the IEEE Standard 802.3 10BASE-T specification.

Although the present invention has been described in accordance with the embodiments shown in the figures one of ordinary skill in the art will recognize there could be variations to those embodiments and those variations would be within the spirit and scope of the present invention.

Accordingly, many modifications may be made by one of ordinary skill in the art without departing from the spirit and scope of the present invention, the scope of which is defined solely by the appended claims.

What is claimed is:

1. A precoded waveshaping switched network transmitter (PWT) comprising:

a delay line circuit for receiving a clock signal and providing a plurality of delayed clock signals, the delay line circuit further comprising a delay stage for receiving the clock signal, the delay stage including a plurality of delay cells, the delay cells being coupled together to provide the delayed clock signals; a sample and hold circuit coupled to the delay stage for sampling the delayed clock signal and the clock signal to determine a phase difference therebetween; and a reset limiting circuit coupled to the delay line circuit and the sample and hold circuit for receiving an external system reset signal, the external system reset signal comprising a power on reset signal, and the clock signal as inputs, and for resetting at a transition edge of the external system reset signal for a predetermined period of time, the reset limiting circuit further comprising a reset means comprising a first flip-flop means for receiving the external system reset signal; a second flip-flop means coupled to the first flip-flop means for receiving a clock signal and an output signal from the first flip-flop means; a third flip-flop means coupled to the second flip-flop means for receiving the clock signal and receiving an output from the second flip-flop means; and a logic gate coupled to the first flip-flop means and the third flip-flop means, the logic gate having a first input and a second input, the first input for receiving the output signal from the first flip-flop means, the second input for receiving an output signal from the third flip-flop means, the logic gate for providing a reset signal which is limited to a predetermined time period that is less than the system reset time period;

a switched network transmitter state machine coupled to the delay line circuit for receiving data signals and the plurality of delayed clock signals and, for generating and transmitting an output code sequence at predetermined timing intervals apart, the output code sequence being synchronized with the clock signal and the data signals, without storing the output code sequence in memory; and a digital to analog converter (DAC) means responsive to the output code sequence for providing a predetermined output signal.

2. The PWT of claim 1 in which the first flip-flop means comprises a reset flip-flop and an inverter coupled to an input of the reset flip-flop.

3. The PWT of claim 1 in which the second and third flip-flop means comprise D flip-flops.

4. The PWT of claim 1 in which the logic gate comprises a NAND gate.

5. A precoded waveshaping transmitter (PWT) comprising:

a delay line circuit for receiving a clock signal and providing a plurality of delayed clock signals, the delay line circuit further comprising a delay stage for receiving the clock signal, the delay stage including a plurality of delay cells, the delay cells being coupled together to provide the delayed clock signal signals, each of the plurality of delay cells comprising first and second delay circuits and each of the plurality of delay cells comprising a zero phase shifting delay cell; a sample and hold circuit coupled to the delay stage for sampling the delayed clock signals and the clock signal to determine a phase difference therebetween; and a reset limiting circuit coupled to the delay line circuit and the sample and hold circuit for receiving an external system reset signal, the external system reset signal comprising a power on reset signal, and the clock signal as inputs, and for resetting at a transition edge of the external system reset signal for a predetermined period of time, the reset limiting circuit further comprising a reset means for receiving the external system reset signal, a predetermined time period setting means coupled to the reset means for receiving a clock signal and an output signal from the reset means, and a logic gate coupled to the reset means and the predetermined time period setting means, the logic gate having a first input and a second input, the first input for receiving the output signal from the reset means, the second input for receiving an output signal from the predetermined time period setting means, the logic gate for providing a reset signal which is limited to a predetermined time period that is less than the system reset time period;

a switched network transmitter state machine coupled to the delay line circuit for receiving data signals and the plurality of delayed clock signals and, for generating and transmitting an output code sequence at predetermined timing intervals apart, the output code sequence synchronized with the clock signal and the data signals, without storing the output code sequence in memory; and a digital to analog converter (DAC) means responsive to the output code sequence for providing a predetermined output signal.

6. The PWT of claim 5 in which the DAC means comprises a 4 bit differential current DAC.

7. The PWT of claim 5 in which the transmitter state machine means further includes enable means for enabling the transmitter state machine and stretching a pulse width of the clock signal.

* * * * *